(12) United States Patent
Bennis (10) Patent No.: US 9,131,400 B2
(45) Date of Patent: Sep. 8, 2015

(54) METHOD AND APPARATUS FOR INTER-RAT INTEGRATION (71) Applicant: Nokia Siemens Networks Oy, Espoo (FI)

(72) Inventor: Mehdi Bennis, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 145 days.

(21) Appl. No.: 13/803,376

(22) Filed: Mar. 14, 2013

(65) Prior Publication Data

US 2014/0269300 A1    Sep. 18, 2014

(51) Int. Cl.
| | |
|---|---|
| *G01R 31/08* | (2006.01) |
| *H04W 28/08* | (2009.01) |
| *H04W 52/24* | (2009.01) |
| *H04W 72/04* | (2009.01) |
| *H04W 72/08* | (2009.01) |
| *H04W 72/12* | (2009.01) |
| *H04W 74/08* | (2009.01) |

(52) U.S. Cl.
CPC .......... *H04W 28/08* (2013.01); *H04W 52/243* (2013.01); *H04W 72/0426* (2013.01); *H04W 72/0453* (2013.01); *H04W 72/082* (2013.01); *H04W 72/1226* (2013.01); *H04W 72/1242* (2013.01); *H04W 74/0816* (2013.01)

(58) Field of Classification Search
CPC ..... H04W 52/343; H04W 28/08; H04J 14/02; H04B 1/38
USPC ............. 370/235; 455/453, 452.2, 561, 522, 455/446, 448
See application file for complete search history.

(56) References Cited

U.S. PATENT DOCUMENTS

2012/0015607 A1*   1/2012   Koskela et al. ................. 455/62
2012/0269067 A1*  10/2012   Burchfiel ..................... 370/236

OTHER PUBLICATIONS

Dual-Band Femtocell Traffic Balancing over Licensed and unlicensed Bands Feilu Liu,—6 pages IEEE—978-1-4577-2053-6.*
Traffic Assignment over licensed and unlicensed bands for Dual-band Femtocells Feilu Liu—6 pages.*
"Inter-Radio Access Technology Integration", Feb. 21, 2013, 10 pgs.
Bennis M., et al.; "Learning coarse correlated quilibria in two-tier wireless networks"; 2012 IEEE, Jun. 10, 2012; pp. 1592-1596, XP032274134.
Feilu Liu, et al.; "Dual-band femtocell traffic balancing over licensed and unlicensed bands"; 2012 IEEE, Jun. 10, 2012, 6 pages, XP032274672.
John L. Tomici, et al.; "Multi-RAT traffic offloading solutions for the bandwidth crunch problem"; 2011 IEEE Long Island, May 6, 2011, pp. 1-6, XP031880722.

* cited by examiner

*Primary Examiner* — Amy Ng
*Assistant Examiner* — Parmanand Patel
(74) *Attorney, Agent, or Firm* — Harrington & Smith (57) ABSTRACT

A method comprises off-loading data traffic from user equipment in a coverage area of a cell from a first band to second band. The off-loading comprises building a probability distribution function of a transmit configuration for power levels of sub-bands for first bands and second bands in the cell and updating the probability distribution function being configured at an end of a selected time interval.

15 Claims, 10 Drawing Sheets

METHOD AND APPARATUS FOR INTER-RAT INTEGRATION

TECHNICAL FIELD

This invention relates generally to wireless communication traffic and, more specifically, to the optimization of wireless networks by combining Wi-Fi and other small cells.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

A cellular telecommunications network is a network distributed over land areas divided into cells, each cell being served by at least one fixed-location transceiver or base station. In a cellular telecommunications network, each cell uses a defined set of frequencies of radio spectrum. When joined together, these cells provide radio coverage over a wide geographic area to enable portable transceivers (e.g., mobile communications devices such as phones, walkie-talkies, laptops, tablets, and the like) to communicate with each other.

Each cell is a macrocell that is configured to provide the radio coverage based on the defined set of frequencies via the base station. Radio coverage within each macrocell may have a range of up to several miles. Due to variations in geography (e.g., hills) and the presence of man-made structures (e.g., buildings), radio coverage may not be consistent throughout a macrocell. This inconsistency in radio coverage may be perceived as an inefficient use of the radio spectrum.

To compensate for this inconsistency, small cells are configured to operate within the macrocells, each small cell generally having a range of about 30 feet to about 200 yards. With mobile service providers (MSPs) attempting to support the growth in mobile data traffic, many MSPs are using mobile data off-loading techniques (namely, the transfer of data to lesser used portions of the radio spectrum) to increase efficiency. Thus, small cells are becoming a common element used for data off-loading in current and past generation communication systems, and many mobile service providers (MSPs) see small cells as playing an increasingly important role in the management of more advanced communication systems currently under development. By some estimates, the number of small cells put into service to accommodate mobile telecommunications traffic is expected to double within a few years.

SUMMARY

This section contains examples of possible implementations and is not meant to be limiting.

In one aspect, an apparatus comprises one or more processors and one or more memories including computer program code. The one or more memories and the computer program code are configured, with the one or more processors, to cause the apparatus to perform at least the off-loading of data traffic from user equipment in a coverage area of a cell from a first band to a second band, the off-loading comprising building a probability distribution function of a transmit configuration for power levels of sub-bands for first bands and second bands in the cell and updating the probability distribution function being configured at an end of a selected time interval.

In another aspect, a method comprises off-loading data traffic from user equipment in a coverage area of a cell from a first band to a second band. The off-loading comprises building a probability distribution function of a transmit configuration for power levels of sub-bands for first bands and second bands in the cell and updating the probability distribution function being configured at an end of a selected time interval.

DETAILED DESCRIPTION OF THE DRAWINGS

In order to cope with peak data traffic demands, mobile service providers (MSPs) are compelled to support the growth in mobile data traffic by finding new ways to boost network capacity for their customers, providing better coverage, and easing network congestion. In doing so, the MSPs generally focus on "pain-point" situations where traffic demand outweighs the network capacity, thus calling for innovative and proactive (rather than reactive) solutions to address situations of inadequate coverage and congestion.

One manner of addressing such issues involves the use of multi-mode small cells operating on both licensed and unlicensed spectrum bands. A small cell has a coverage area that is smaller than a coverage area of a macrocell, with the coverage area of the small cell underlying the coverage area of the macrocell. In short, small cells are fundamentally different from macrocells in that small cells are of much smaller footprints and are autonomous, self-organizing, and self-adaptive so as to maintain low operating costs. Various types of small cells include femtocells (which are connected to the MSP via a DSL, cable, or Ethernet connection and user-deployed closed/open/hybrid access), picocells (which include dedicated backhauls and operator-deployed open access), microcells (which cover limited geographical areas), and relays (which extend coverage areas). In the exemplary embodiments disclosed herein, small cells operating in the licensed spectrum that are currently available for mobile technology standards using protocols such as GSM, CDMA, TD-SCDMA, and the like are used to leverage the already-existing Wi-Fi component that operates in the unlicensed spectrum. This use of small cells in the licensed spectrum, in conjunction with leveraging using Wi-Fi in the unlicensed spectrum, is used to optimize the overall network performance.

The concept of integrating Wi-Fi with small cells holds the promise of helping MSPs solve the problem of insufficient network capacity, which is often exacerbated by cell densification and network heterogeneity. Wi-Fi technology has limits that small cells can capitalize on, such as in cases of high traffic congestion and load, in which a large number of Wi-Fi users compete in a shared but uncontrolled spectrum, yielding dramatically poor throughputs. In contrast, a better managed small cell operation transmitting over the licensed spectrum can yield better overall network performance gains.

In the exemplary embodiments disclosed herein, a self-organizing, traffic off-loading framework is proposed. In this framework, small cells (seamlessly) steer their respective traffic between 3G and Wi-Fi radio access technologies (RATs) as a function of (heterogeneous) users' traffic requirements, network load, and interference levels. Leveraging the unlicensed but potentially congested Wi-Fi band, small cells engage in a long-term self-organizing process by learning their optimal transmission configuration over both licensed and unlicensed bands. To do so, a proactive look-ahead scheduling mechanism is used by which traffic suitable for delay-tolerant applications (e.g., e-mail) is off-loaded to the Wi-Fi network while delay stringent applications (e.g., video, streaming, and the like) are steered towards the licensed spectrum with quality-of-service (QoS) guarantees. This long-term self-organizing learning process on the Wi-Fi band is carried out on a faster time-scale, as compared to the licensed band, in which the goal is to balance the load between both RATs. Providing the cross-system learning framework with the proactive look-ahead scheduling mechanism leads to significant gains, thereby outperforming other traffic steering and off-loading policies.

Figure 1:
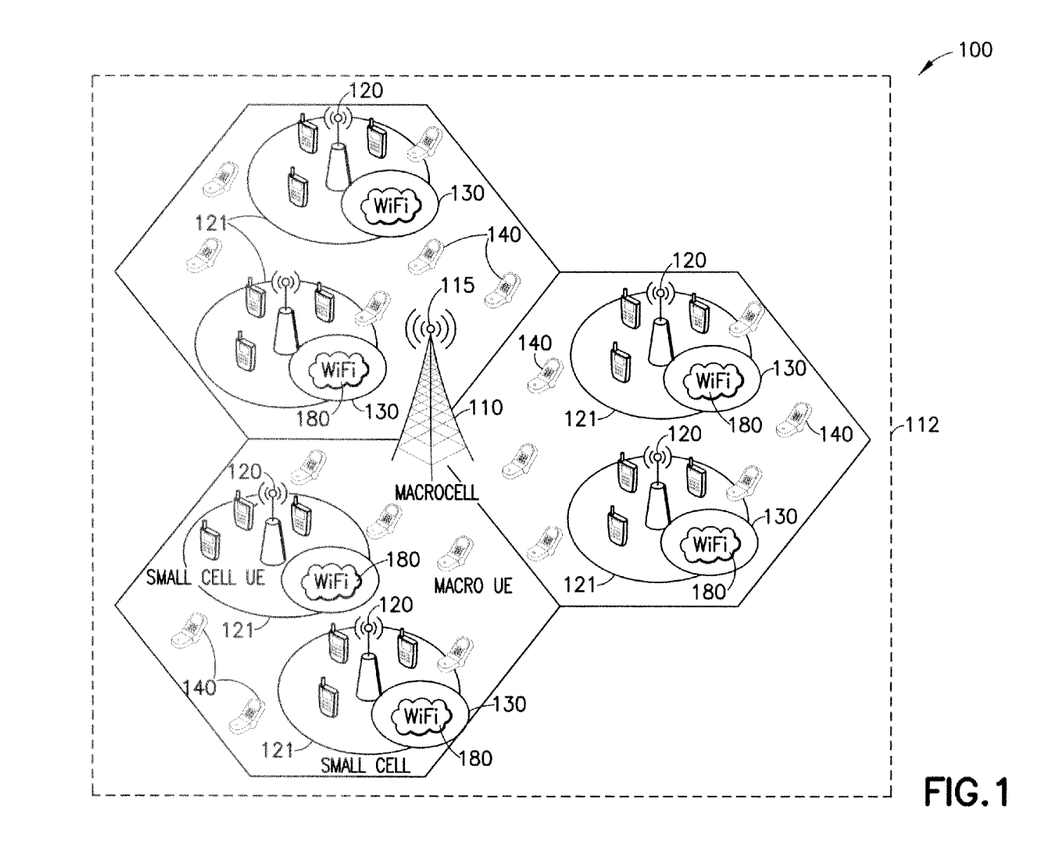
FIG. 1 is a schematic illustration of a heterogeneous network that integrates both small cells and Wi-Fi radio access technologies.

Before proceeding with a more detailed description of the exemplary embodiments, reference is now made to FIG. 1, which illustrates a network 100 defined by a macro base station 110 (mBS 110) having one or more antennas 115 and providing a macrocell coverage area 112. Within the macrocell coverage area 112 is one or more small cell base stations 120 (SCBS 120) defined by respective small cell coverage areas 121 (SCCA 121). One or more Wi-Fi coverage areas 130 are located within each respective SCCA 121, each Wi-Fi coverage area 130 having a Wi-Fi access point 180. User equipment 140 (UE 140) is configured to move within and between each SCCA 121 to access the Wi-Fi access points 180.

Figure 2:
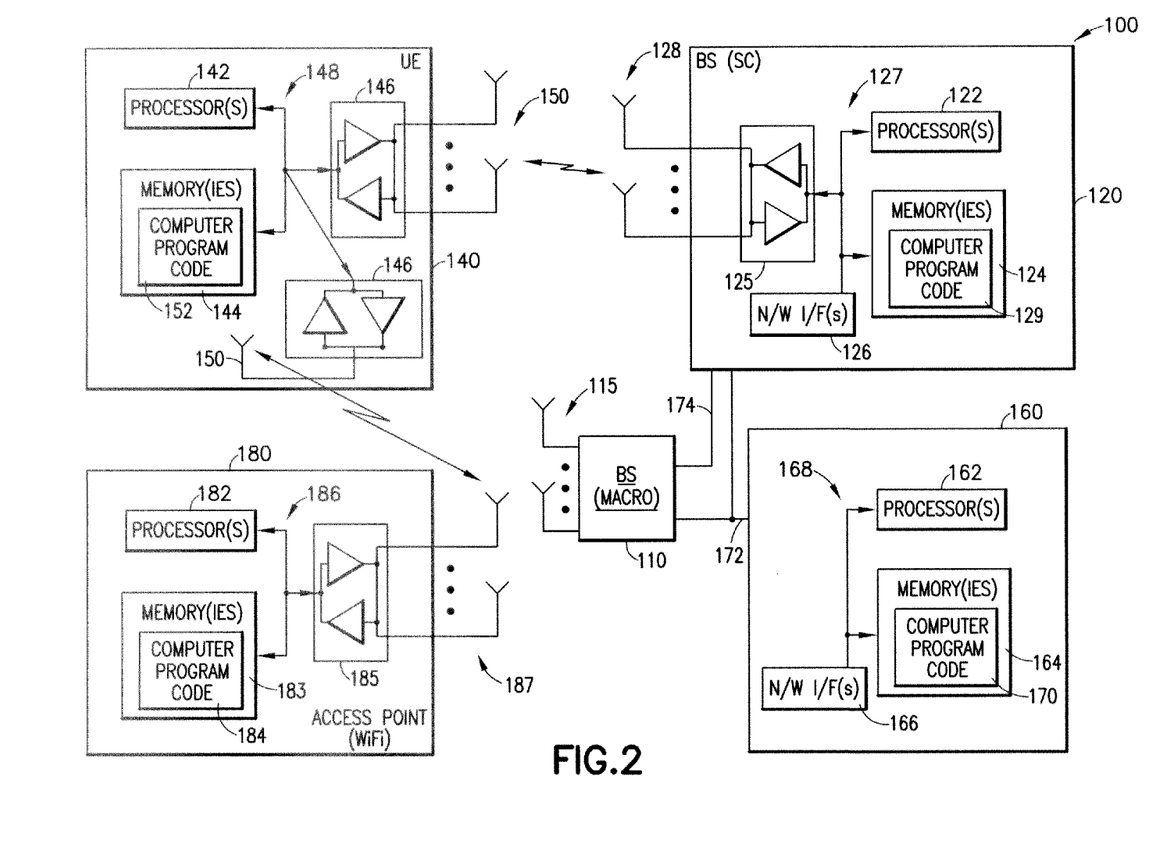
FIG. 2 is a schematic illustration of a telecommunications interaction system for use with the network of FIG. 1.

FIG. 2 illustrates an exemplary system by which the exemplary embodiments of the network 100 may be practiced. In FIG. 2, the network 100 comprises the user equipment 140 in wireless communication with both the SCBS 120 and the Wi-Fi access points 180. The user equipment 140 includes one or more processors 142, one or more memories 144, and one or more transceivers 146 interconnected through one or more buses 148. The one or more transceivers 146 are connected to one or more antennas 150. The one or more memories 144 include computer program code 152. The memory 144 and the computer program code 152 are configured to, with the processor 142, cause the user equipment 140 to perform one or ore of the operations as described herein.

The network 100 also may also comprise an O&M system 160 in wired communication with the mBS 110. The O&M system 160 provides operation and maintenance of the mBS 110 and one or more processors 162, one or more memories 164, and one or more network interfaces (N/W I/F(s)) 166 interconnected through one or more buses 168. The memories 164 include computer program code 170. The memory 164 and the computer program code 170 are configured to, with the processor 162, cause the O&M system 160 to perform one or more of the operations as described herein. The network interface 166 communicates with the mBS 110 over networks such as the networks 172, 174.

The internal elements of the SCBS 120 will be described herein, and it is assumed the mBS 110 and the Wi-Fi access points 180 are similar. The SCBS 120 includes one or more processors 122, one or more memories 124, one or more network interfaces (N/W I/F(s)) 126, and one or more transceivers 125 interconnected through one or more buses 127. The one or more transceivers 125 are connected to one or more antennas 128, which wirelessly communicate with the one or more antennas 150 of the user equipment 140. The one or more memories 124 include computer program code 129. The one or more memories 124 and the computer program code 129 are configured to, with the processors 122, cause the SCBS 120 to perform one or more of the operations as described herein. The one or more network interfaces 126 communicate over networks such as the networks 172, 174.

The mBS 110 and the SCBS 120 communicate using, e.g., network 174. The network 174 may be wired or wireless or both and may implement, e.g., an X2 interface. The O&M system 160 uses the network 172 to communicate with the mBS 110. The network 172 may be wired or wireless or both and may implement, e.g., a Type 1 or Type 2 interface.

The Wi-Fi access points 180 each include one or more processors 182 and one or more memories 183, the memories 183 including computer program code 184. The one or more processors 182 and the one or more memories 183 are interconnected to one or more transceivers 185 through one or more buses 186. The one or more transceivers 185 are connected to one or more antennas 187, which wirelessly communicate with the one or more antennas 150 of the user equipment 140. The one or more memories 183 of the Wi-Fi access points 180 and the computer program code 184 are configured to, with the one or more processors 182, cause the Wi-Fi access points 180 to perform one or more of the operations as described herein.

The computer readable memories 124 and 164 may be of any type suitable to the local technical environment and may be implemented using any suitable data storage technology, such as semiconductor based memory devices, flash memory, magnetic memory devices and systems, optical memory devices and systems, fixed memory, and removable memory. The processors 122 and 162 may be of any type suitable to the local technical environment, and may include one or more of general purpose computers, special purpose computers, microprocessors, digital signal processors (DSPs), and processors based on a multi-core processor architecture, as non-limiting examples.

The exemplary embodiments as disclosed herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In this context, a "computer-readable medium" may be any media or means that can contain, store, communicate, propagate, or transport the instructions for use by or in connection with an instruction execution system, apparatus, or device, such as a computer-based system, with one example of such a system described and depicted, e.g., in FIG. 2. A computer-readable medium may comprise a computer-readable storage medium (e.g., memory 124, 164, or other device) that may be any media or means that can contain or store the instructions for use by or in connection with an instruction execution system, apparatus, or device, such as a computer system.

To carry out the exemplary embodiments, a network model of M=1 macrocell base stations (mBS) operates over a set S={1, . . . , S', . . . S} of S frequency bands out of which S' are over the licensed spectrum. A set K={1, . . . , K} of K SCBSs underlay the mBS. Each SCBS (e.g., SCBS 120) is dual-mode and can transmit over both licensed and unlicensed bands to serve associated UEs 140 (see FIG. 1).

The downlink transmit power of a SCBS j on a sub-band (SB) s is designated by $p_j^{(s)}$; $|h_{i,j}^{(s)}|^2$ denotes the channel gain between the SCBS 120 and its associated UE 140 in sub-band s∈S; and $N_0^{(s)2}$ is the variance of additive white Gaussian noise (AWGN) at receiver k, which (for simplicity) is assumed to be constant over all sub-bands. Then, $p_{k,max}$ with k∈K is the maximum transmit power of SCBS k. For all k∈K, the S-dimensional vector $p_k(t)=(p_k^{(1)}(t), \ldots, p_k^{(S)}(t))$ denotes the power allocation (PA) vector of SCBS k∈K at time t. Here, $p_k^{(s)}(t)$ is the transmit power of SCBS k over sub-band s at time t. All SCBSs are assumed to transmit over the licensed and unlicensed spectrum band at each time t with a given power level not exceeding $p_{k,max}$. Then, $L_k\in N$ is the number of discrete power levels of SCBS k, and $q_k^{(l,s)}$ denotes the l-th transmit power level when used over channel s, with (l,s) ∈$L_k$×S and with $L_k$={1, . . . , $L_K$}. Also, $q_k^{(0,0)}$ denotes, with k∈K, the S-dimensional null vector (i.e. $q^{(0,0)}=(0, \ldots, 0)\in R^S$). Thus, SCBS k has $N_k=L_k\cdot S+1$ possible PA vectors and for all t∈N, $p_k(t)\in A_k$ where:

$$A_k = q^{(0,0)} \cup \{q_k^{(l,s)}: (l,s)\in L\times S\}. \qquad \text{Eq. 1}$$

The signal-to-interference-plus-noise-ratio (SINR) for SCBS k∈K serving its user equipment $k_i\in\{1, \ldots K_i\}$ is given by:

$$SINR_{k_i}^{(s)} = \frac{|h_{k_i,k_i}^{(s)}|^2 p_{k_i}^{(s)}}{\sigma_k^{(s)2} + \underbrace{|h_{k_i,0}^{(s)}|^2 p_0^{(s)}}_{MBS} + \underbrace{\sum_{j\in K\backslash\{k\}} |h_{k_i,j}^{(s)}|^2 p_j^{(s)}}_{SCBS}}. \qquad \text{Eq. 2}$$

Each SCBS k is interested in optimizing its (long-term) utility metric (i.e., small cell throughput) in both licensed and unlicensed spectrum:

$$u_k(p_k, p_{-k}) = E\left(\sum_{s=1}^{S}\sum_{k_i=1}^{K_i} \log_2(1 + SINR_{k_i}^{(s)})\right), \qquad \text{Eq. 3}$$

To then defined a game theoretic model, the joint interference management and load balancing problem is modeled as a normal-form game G=(K, $\{A_k\}_{k\in K}, \{u_k\}_{k\in K}$). Here, K represents the set of SCBSs (i.e. players) in the network and for all k∈K, the set of actions of SCBS k is the set of sub-bands and power allocation vectors $A_k$ described in Eq. 1. Then, $A=A_1\times \ldots \times A_K$ denotes the action set, and $u_k:A_k\to R^+$ is the payoff function of SCBS k.

At each time t and ∀k∈K, each SCBS k chooses its action from the finite set $A_k$ following a probability distribution $$p_k(t) = \left(\pi_{k,q_k^{(0,0)}}(t), \pi_{k,q_k^{(1,1)}}(t), \ldots, \pi_{k,q_k^{(L_k,S_k)}}(t)\right)$$

where $$\pi_{k,q_k^{(l_k,s_k)}}$$

is the probability that SCBS k plays action $q_k^{(l_k,s_k)}$ at time t, i.e., $$\pi_{k,q_k^{(l_k,s_k)}} = Pr(p_k(t) = q_k^{(l_k,s_k)}). \qquad \text{Eq. 4}$$

where $(l_k, s_k)\in\{1, \ldots, L_K\}\times S\cup\{(0,0)\}$.

The inter-RAT integration is embodied in a framework that allows SCBSs 120 to optimize their transmission over the licensed band by off-loading traffic to the Wi-Fi network. For this purpose, a framework for self-organizing radios (cross-system learning) is proposed in which SCBSs 120 judiciously steer their traffic over both the licensed and unlicensed spectrum. Hence, each SCBS 120 learns over time how to select sub-bands and corresponding power levels in licensed and unlicensed bands. The cross-system learning procedure is accordingly described to select suitable sub-bands, followed by the proactive scheduling mechanism. This scheduling mechanism is traffic-aware and takes into account the users' QoS requirements, e.g. throughput and latency.

In using the network 100 to practice the exemplary embodiments herein, the proactive look-ahead scheduling mechanism allows the SCBSs 120 to strike a balance between maximizing long-term performance (over the licensed spectrum) while minimizing the regret of off-loading traffic to Wi-Fi (the unlicensed spectrum). The SCBSs 120 are configured to receive only local information as a form of feedback from the UE 140 within the SCBSs 120. The action or strategy of every SCBS 120 is a characteristic power level on a given sub-band of the spectrum.

Also in the exemplary embodiments described herein, a behavioral rule is defined for each small cell. This behavioral rule is configured to choose actions that yield high regrets more likely than those actions that yield lower regrets, but in any case always allowing a non-zero probability of playing any of the actions.

Figure 3:
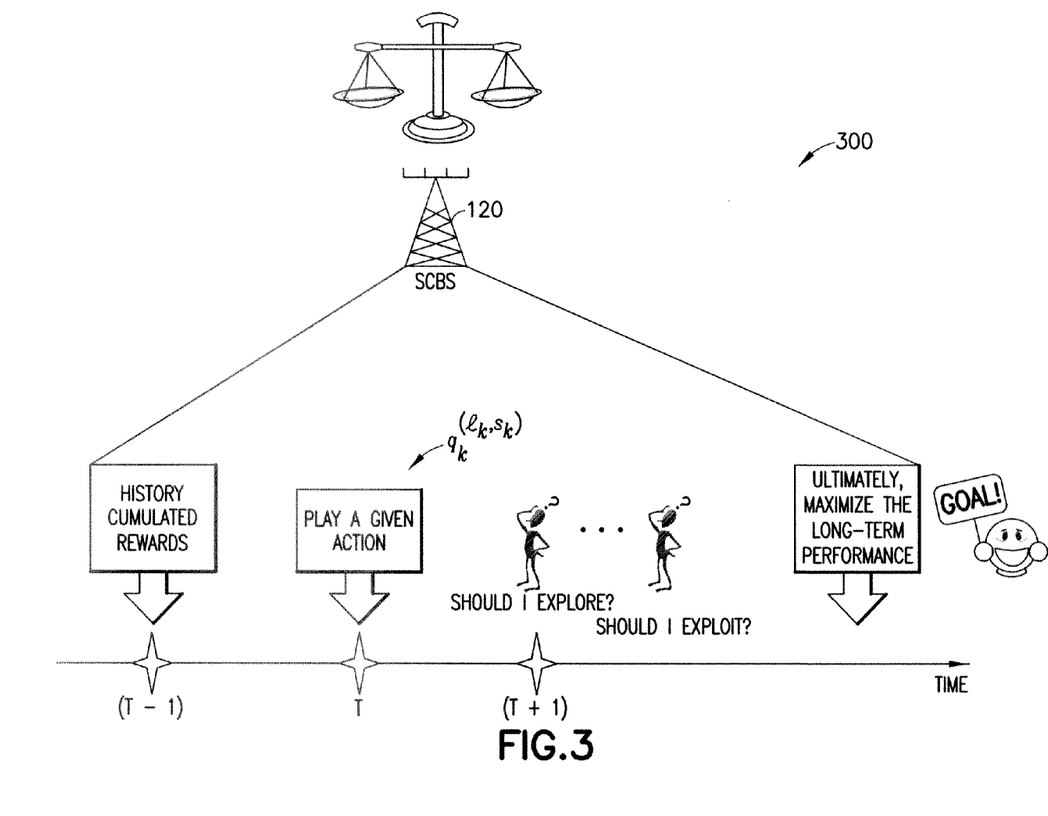
FIG. 3 is a graphic illustration of a telecommunications interaction system in which the system "learns" an environment.

Referring now to FIG. 3, a system of exploration and exploitation is designated generally by the reference number 300 and is hereinafter referred to as "system 300." System 300 is carried out by each SCBS 120 such that over time, the SCBS 120 "learns" its environment by accumulating rewards, which are used to infer future actions and strategies. The system 300 operates such that every SCBS 120 builds a probability distribution function (PDF) of its respective transmit configuration. This PDF is updated at every time instant t.

In the system 300, every SCBS 120 carries out a two-phase procedure comprising selecting a sub-band based on spectrum usage characteristics for the licensed and unlicensed bands. The first phase of this procedure involves a sub-band selection algorithm, by which the SCBS 120 selects a suitable sub-band by balancing between exploring new actions/strategies and exploiting what has previously been learned based on accumulated history.

In implementing the sub-band selection algorithm, a considered behavioral assumption is that all small cells are interested in choosing a probability distribution $p^* \epsilon \Delta(A)$ that minimizes the regret, where the regret of SCBS k for not having an played action $q_k^{(l_k, s_k)}$ from a selected time interval of n=1 up to time t is calculated as follows:

$$r_{k, q_k^{(\ell,s)}}(t) = \frac{1}{t} \sum_{n=1}^{t} u_k(q_k^{(\ell,s)}, p_{-k}(n)) - \tilde{u}_k(n), \quad \text{Eq. 5}$$

where $\tilde{u}_k(n)$ is the time-average of player k's utility observations obtained by constantly changing its actions following a particular strategy $\pi_k$. This behavioral assumption can be modeled by the probability distribution $\beta_k(r_k^+(t))$ satisfying:

$$\beta_k(r_k^+(t)) \in \arg\min_{p_k \in \Delta(A_k)} \left[ \sum_{p_k \in A_k} \pi_{k,p_k} r_{k,p_k}(t) + \frac{1}{\kappa_k} H(p_k) \right], \quad \text{Eq. 6}$$

where $r_k^+(t) = \max(0, r_k(t))$ denotes the vector of positive regrets and H represents the Shannon entropy function of the mixed strategy. The temperature parameter $\kappa_k > 0$ represents the interest of SCBS k to choose other actions rather than those minimizing the regret to improve the estimations of the vectors of regrets as calculated in Eq. 5. The unique solution to the right-hand-side of the continuous optimization problem in Eq. 6 is written as:

$$\beta_k(r_k^+(t)) = \left( \beta_{k, q_k^{(0,0)}}(r_k^+(t)), \beta_{k, q_k^{(1,1)}}(r_k^+(t)), \ldots, \beta_{k, q_k^{(L_k, A_k)}}(r_k^+(t)) \right) \quad \text{Eq. 7}$$

where $\forall k \in K$ and for all $(l_k, s_k) \in L_k \times S$:

$$\beta_{k, q_k^{(l_k, s_k)}}(r_k^+(t)) = \frac{\exp\left(\kappa_k r_{k, q_k^{(l_k, s_k)}}^+(t)\right)}{\sum_{p_k \in A_k} \exp\left(\kappa_k r_{k, p_k}^+(t)\right)}, \quad \text{Eq. 8}$$

where $$\beta_{k, q_k^{(l_k, s_k)}}(r_k^+(t)) > 0$$

holds with strict inequality regardless of the regret vector $r_k(t)$. If $$r_{k, q_k^{(l_k, s_k)}}(t) > 0,$$

then SCBS k∈K would have obtained a higher average utility by playing action $q_k^{(l_k, s_k)}$ during all the previous stages. Thus, player k regrets for not having played the action $q_k^{(l_k, s_k)}$.

The second phase of the procedure is a long-term traffic-aware scheduling mechanism. After every SCBS 120 acquires its sub-band, the SCBS 120 schedules UEs 140 according to their QoS requirements by considering instantaneous channel conditions and completion time of each transmission. In short, the SCBSs 120 carry out their (long-term) traffic aware scheduling procedure on the resource blocks of the selected sub-band in the licensed spectrum, whereas in the unlicensed band, a sub-band is allocated to a given UE 140 and for a fixed transmission time. By means of the cross-system learning procedure, the SCBS 120 attempts to access the unlicensed band at random time instants through sensing and selects the unlicensed sub-band whenever sensed idle for a fixed duration. Otherwise, the SCBS 120 does not access the unlicensed band and waits for the next access opportunity. Three parameters that describe the channel access procedure in the unlicensed band are defined as:

Attempt interval: one or more periods of time of access opportunities, which is random for each SCBS 120.

Transmission duration: one or more periods of time over which an SCBS 120 accesses the unlicensed band after a successful channel access attempt. Within this duration, the SCBS 120 allocates its selected sub-band to one UE 140, either based on a coverage or load policy. Under the coverage-based policy, the UE 140 with maximum reference signal received power (RSRP) is selected, while in the load-based policy SCBSs 120 strike a balance between various network parameters pertaining to a standard for wireless communication (e.g., LTE, 3G, and the like) and Wi-Fi networks. Here, UEs 140 with non real-time sensitive traffic models (e.g., FTP) are steered towards the unlicensed band based on a set of thresholds.

Sensing duration: one or more periods of time (e.g., 1 ms) duration during which the SCBS 120 senses the unlicensed band.

The proposed traffic-aware scheduling algorithm incorporates users' traffic requirements, in which the scheduling decision is not only based on the instantaneous channel condition, but also on the completion time (delay), and users' service class. In an exemplary embodiment of the algorithm, $D_{k_i}(t)$ denotes the scheduling metric of UE $k_i$ serviced by SCBS i. In particular, $D_{k_i}(t)$ is a cost function for the UE $k_i$ which is used to perform the scheduling decision at the SCBS 120. This cost function accounts for the instantaneous channel state information and dynamics of file size in a more integrated manner. The proactive scheduling algorithm then encompasses the following two phases:

Phase I: Within every small cell, all users are sorted in an ascending order as a function of their remaining file size $X_{k_i}(t)$ and the estimated average data rate $\bar{u}_{k_i}$, of UE $k_i$, which corresponds to the time averaged utility $u_{k_i}$. The position of a UE $k_i$ is denoted by $P_{k_i}(t)$, which reflects the priority of a UE according to its expected transmission completion time.

Phase II: Depending on this position, the following cost metric $D_k(t)$ is calculated:

$$D_{k_i}(t) = (P_{k_i}(t) - 1) - (M_k(t) - P_{k_i}(t) + 1)\left(\frac{X_{k_i}(t)}{\bar{u}_{k_i}} - 1\right), \quad \text{Eq. 9}$$

where $M_k(t)$ denotes the number of UEs served by SCBS k at time t, having data in their traffic queue. Finally, the scheduled UE $k_i$ at time instant t is performed for each resource block based on:

$$k_i^* = \underset{k_i}{\arg\min}(D_{k_i}(t)) \qquad \text{Eq. 10}$$

Figure 4:
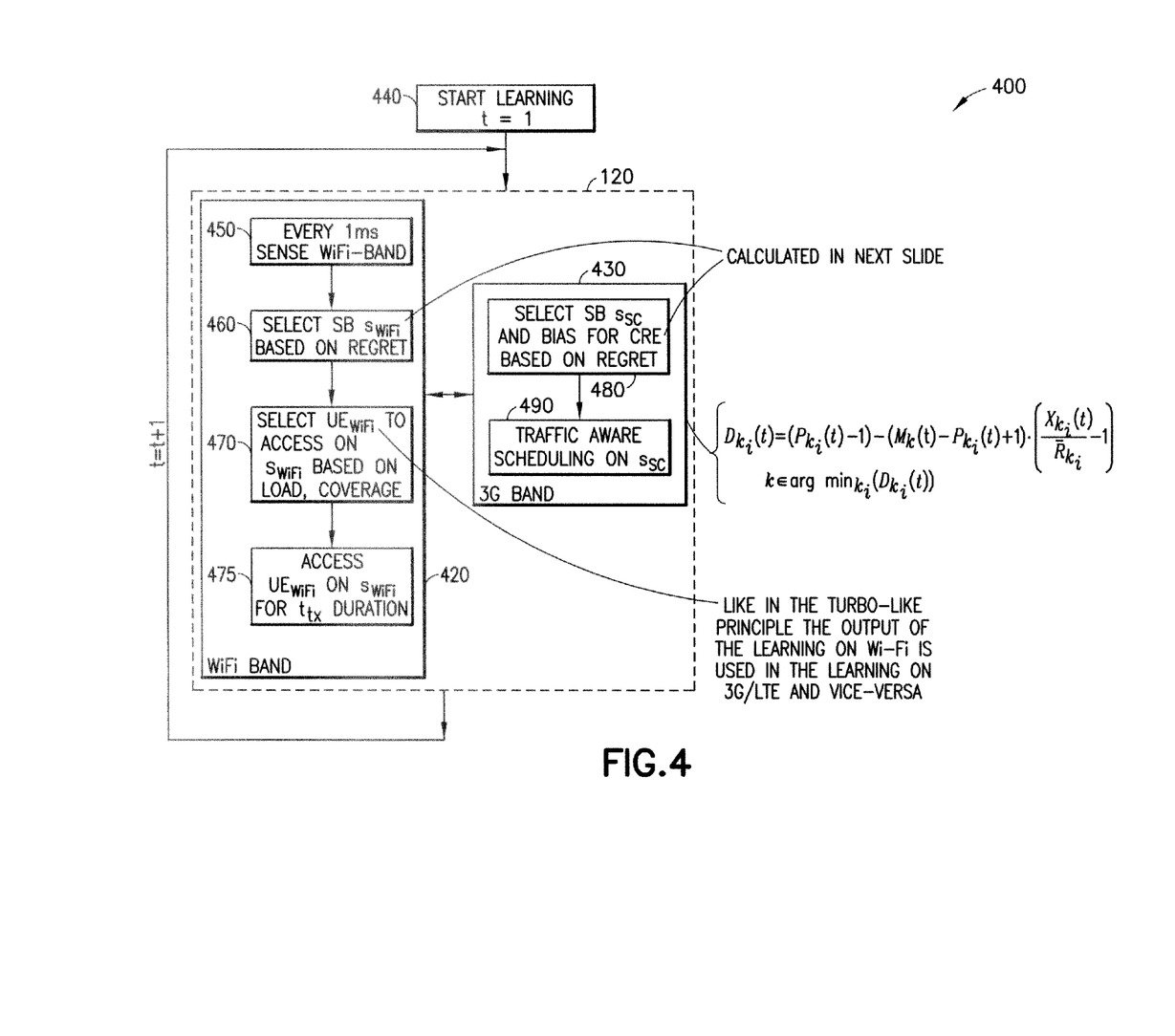
FIG. 4 is a flowchart by which a base station can learn an environment by balancing between exploration and exploitation.

Referring now to FIG. 4, a flow by which the SCBS 120 can learn by balancing between exploring new actions and/or strategies and exploiting what has already been learned to integrate the RATs is designated generally by the reference number 400 and is hereinafter referred to as "flow 400." In the flow 400, delay tolerant applications are steered towards the Wi-Fi spectrum band 420, whereas delay intolerant applications are steered towards the licensed spectrum band 430. Also, different policies for traffic off-loading to the unlicensed Wi-Fi spectrum band 420 may be implemented. In particular, policies may be implemented to (i) balance the total load between the Wi-Fi spectrum band 420 and the licensed spectrum band 430; (ii) off-load traffic based on the coverage provided by the SCBS 120; (iii) off-load traffic based on the supportive capacity of the user equipment 140; or (iv) provide any combination of the foregoing.

In executing the flow 400, a learning step 440 is initiated at an initial time of Control is then passed to the SCBS 120, in which the inter-RAT function is carried out. In carrying out the inter-RAT function, data is exchanged between the Wi-Fi spectrum band 420 and the licensed spectrum band 430.

To carry out the channel access procedure in the unlicensed Wi-Fi spectrum band 420, the sensing duration is carried out by the UE 140 at selected time intervals as a sensing step 450 to sense the Wi-Fi sub-bands. The selected time intervals may be, for example, every 1 millisecond (ms). Sensing is not limited to 1 ms time intervals, however, and may occur at other time intervals. Any suitable clock function may be used to provide the desired time intervals.

A Wi-Fi sub-band, based on a regret calculation, is then selected by the SCBS 120 in a Wi-Fi sub-band selection step 460. The SCBS 120 also selects the UE 140 for access on the Wi-Fi sub-band in a UE selection step 470.

The transmission duration is then selected by the UE 140 in a transmission duration step 475.

Data from the channel access procedure in the unlicensed Wi-Fi spectrum band 420 is then exchanged with data from the channel access procedure as it pertains to the licensed spectrum band 430. In the licensed spectrum band 430, a small cell sub-band $s_{sc}$ and bias for a cell range expansion to increase the footprint of the small cell is selected (based on a regret calculation) in a sub-band selection step 480. Additionally, in a scheduling step 490, the cost metric $D_{k_i}(t)$ is calculated and used to perform the scheduling decision at the SCBS 120.

Figure 5:
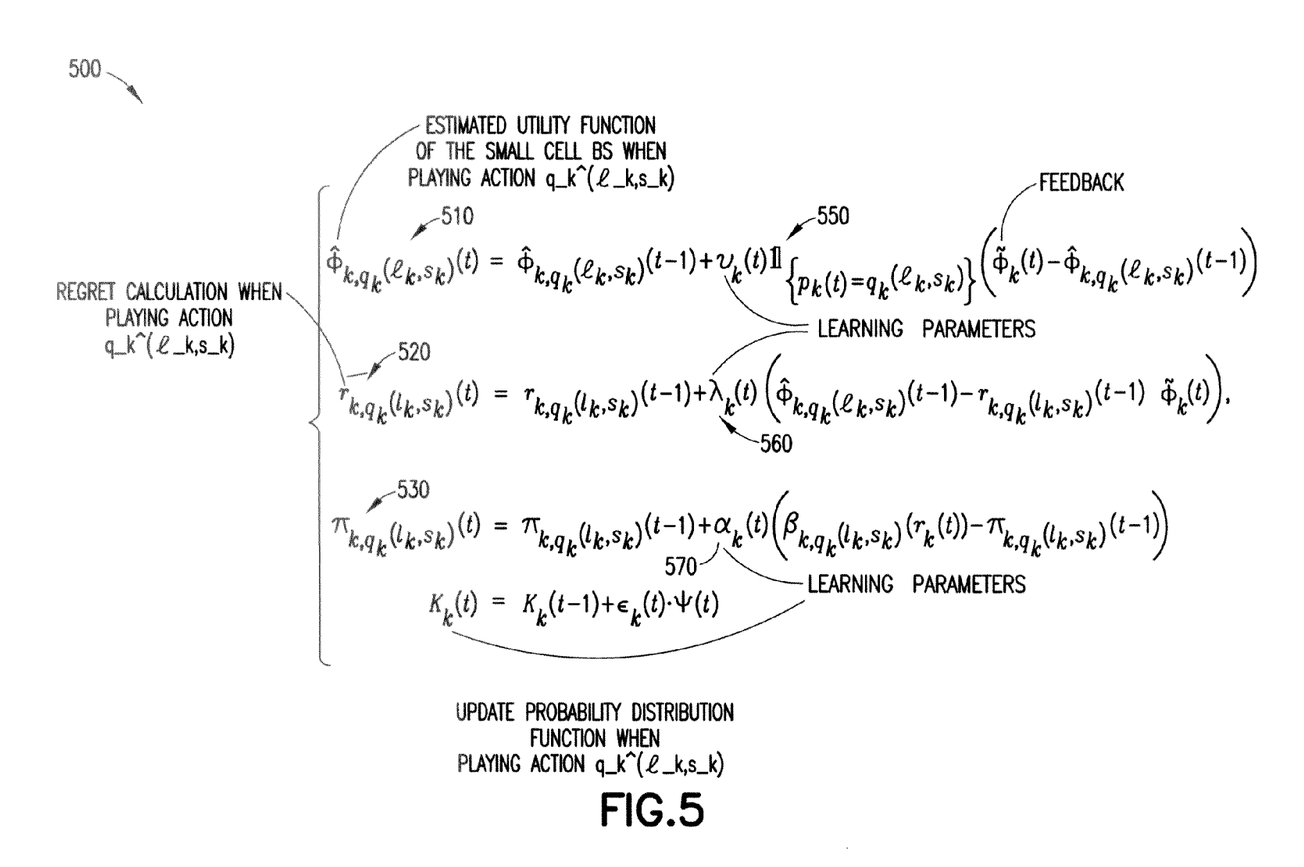
FIG. 5 is a diagram illustrating equations of functions utilized to provide for the inference of future actions and strategies.

Referring now to FIG. 5, the various functions utilized to provide for the inference of the future actions and strategies are designated generally by the reference number 500. The various functions 500 comprise an estimated utility function, shown at 510, of the SCBS 120 for the played action $q_k^{(l_k, s_k)}$, a regret calculation function, shown at 520 and which corresponds to Eq. 5 above, for the designated playing action, and an update probability distribution function, shown at 530, for the designated playing action $q_k^{(l_k, s_k)}$. Each function comprises a learning parameter. In particular, the estimated utility function 510 includes the learning parameter 550; the regret calculation function 520 includes the learning parameter 560; and the update probability distribution function 530 includes the learning parameter 570. Each of the foregoing learning parameters varies with time.

EXAMPLE

Various simulations were run for consideration in a scenario to validate a cross-system learning framework in an LTE-A simulator integrating W-Fi capabilities. Time and frequency selective multi-carrier Wi-Fi with a mix of traffic distributions was considered. The considered scenario comprises one macrocell consisting of three sectors underlaid with an arbitrary number of K open access small cells operating on both 3 G and WiFi (See FIG. 1). The SCBSs 120 are uniformly distributed within each macro sector, while considering a minimum mBS-SCBS distance of 75 meters (m). The path-loss models and other set-up parameters were selected according to the 3 rd Generation Partnership Project (3GPP) recommendations for outdoor picocells.

$N_{UE}=30$ mobile UEs 140 were dropped within each macro sector out of which $N_{hotspot}=\frac{2}{3} N_{UE}/K$ were randomly and uniformly dropped within a 40 meter (m) radius of each SCBS, while the remaining UEs 140 were uniformly dropped within each macro sector. Each UE 140 was assumed to be active, with a fixed traffic model from the beginning of the simulations while moving at a speed of 3 kilometers per hour (km/h). The traffic mix consisted of different traffic models following the requirements of the Next Generation Mobile Networks (NGMN).

The bandwidth in the licensed band was 5 MHz, and the bandwidth in the unlicensed band was 20 MHz. The simulations were averaged over 500 transmission time intervals (TTIs). For comparison, the following cases were considered:

Macro-only: The macrocell was the only serving cell of all UEs 140 using a proportional fare (PF) scheduler by uniformly distributing its maximum transmission power over the whole bandwidth.

HetNet: SCBSs were activated and transmitted only on the licensed band. In doing so, both mBS and SCBSs 120 served their UEs 140 in the licensed band. Uniform power distribution was assumed per sub-band.

HetNet in combination with Wi-Fi (load-based): each SCBS transmitted on both licensed and unlicensed bands by selecting one sub-band on each licensed and unlicensed band. Access to the unlicensed band was performed based on the load as described above, and PF scheduling was performed on the licensed band.

HetNet in combination with Wi-Fi (coverage-based): Same as HetNet combined with the WiFi load-based except that the access method on the unlicensed band was based on the maximum received power criterion.

Figure 6:
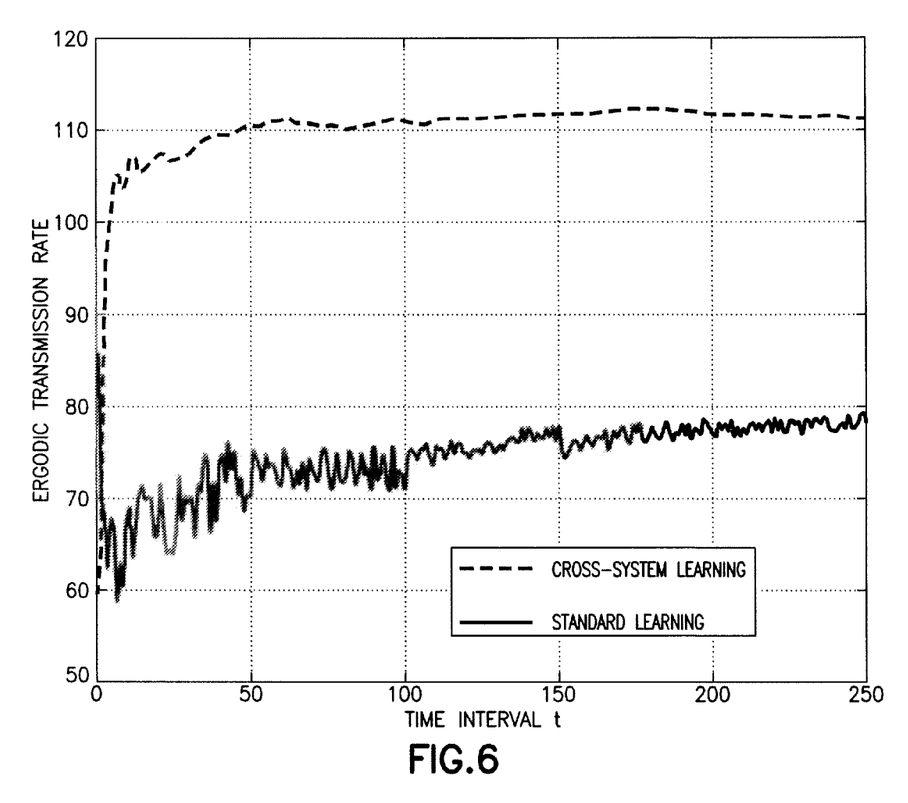
FIG. 6 is a graphical representation illustrating an ergodic transmission rate of a proposed cross-system learning algorithm versus time.

FIG. 6 plots the convergence behavior of the proposed cross-system learning algorithm in terms of an ergodic transmission rate. In doing so, ten UEs 140 per macro sector were considered, with 1.4 MHz bandwidth in the licensed band. In addition, the standard RL algorithm was plotted, in which learning was carried out independently over both licensed and unlicensed bands. It was shown that the cross-system learning approach converged within less than 50 iterations, while the standard approach utilized several hundreds iterations to converge. Furthermore, the standard procedure exhibited an undesirable oscillating behavior (i.e., ping-pong effect between the licensed and unlicensed band).

Figure 7:
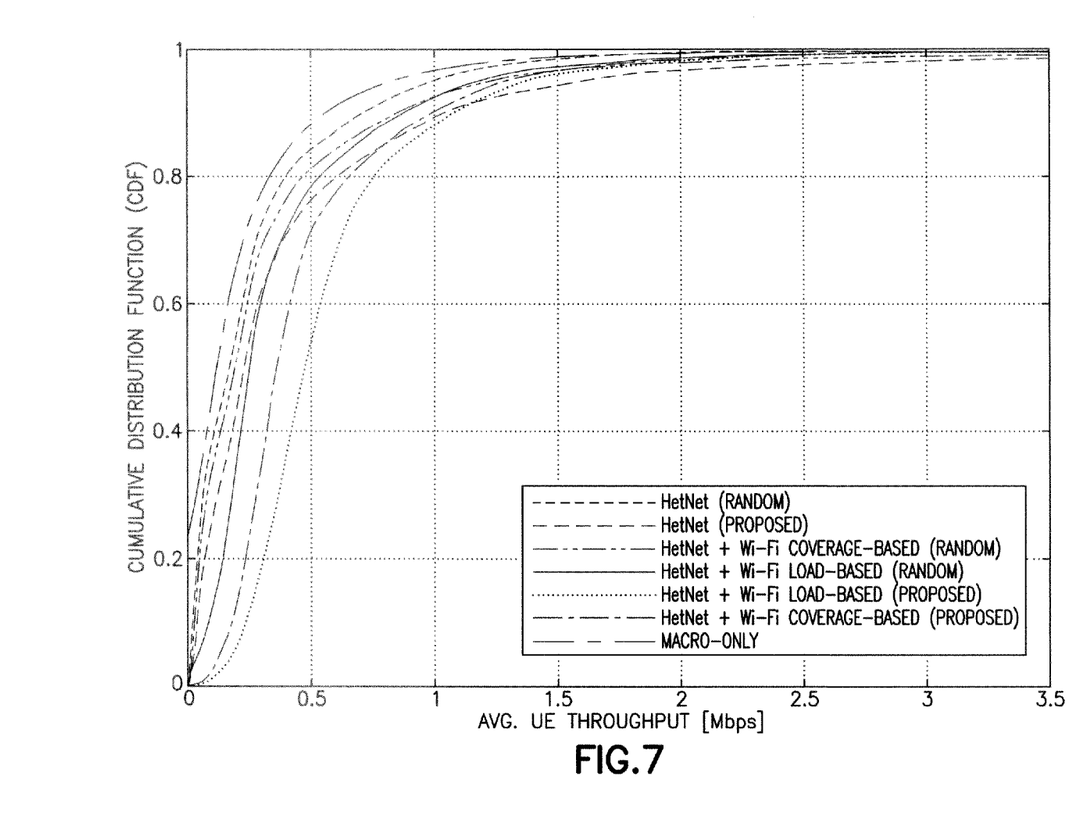
FIG. 7 is a graphical representation illustrating a cumulative distribution function of an average UE throughput for a given number of UEs.

FIG. 7 plots the cumulative distribution function (CDF) of the average UE 140 throughput for $N_{UE}=30$ UEs. In the case of "random," an SCBS 120 randomly selected one sub-band and performed PF scheduling, whereas "proposed" referred to the regret-based sub-band selection with traffic-aware (TA) scheduling. In the "macro-only" case, 25% of UEs 140 obtained no rate, and deploying small cells was shown to increase the performance, especially for cell-edge UEs. In particular, the proposed solution (HetNet combined with Wi-Fi load-based) yielded the best performance, outperforming the other benchmark solutions.

Figure 8:
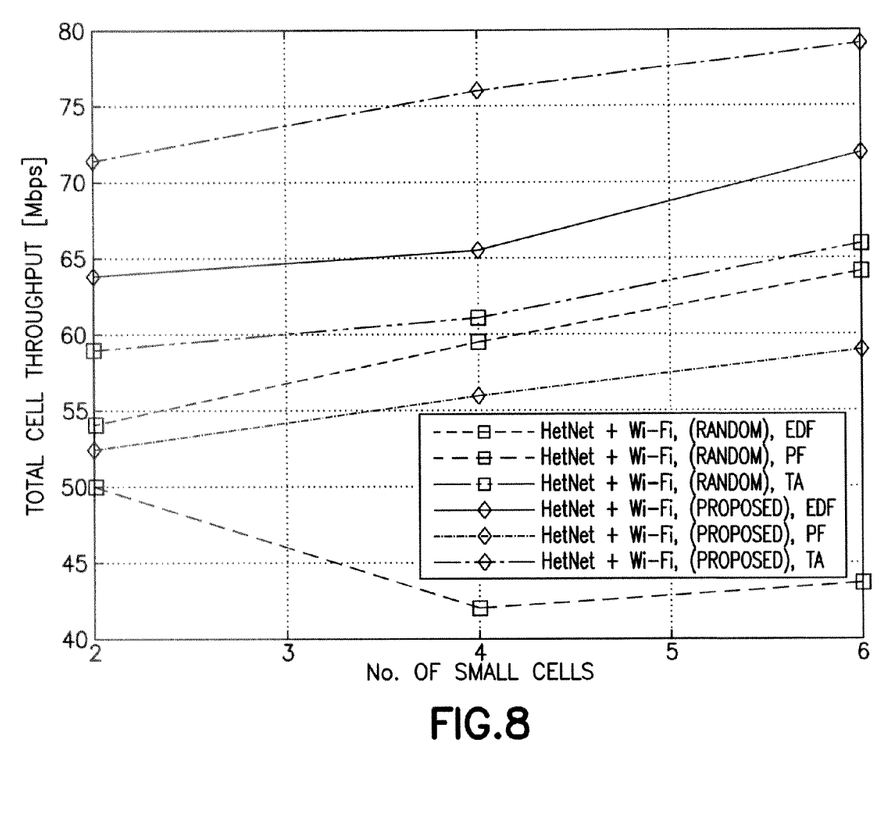
FIG. 8 is a graphical representation illustrating a total cell throughput as a function of the deployed small cells.
Figure 9:
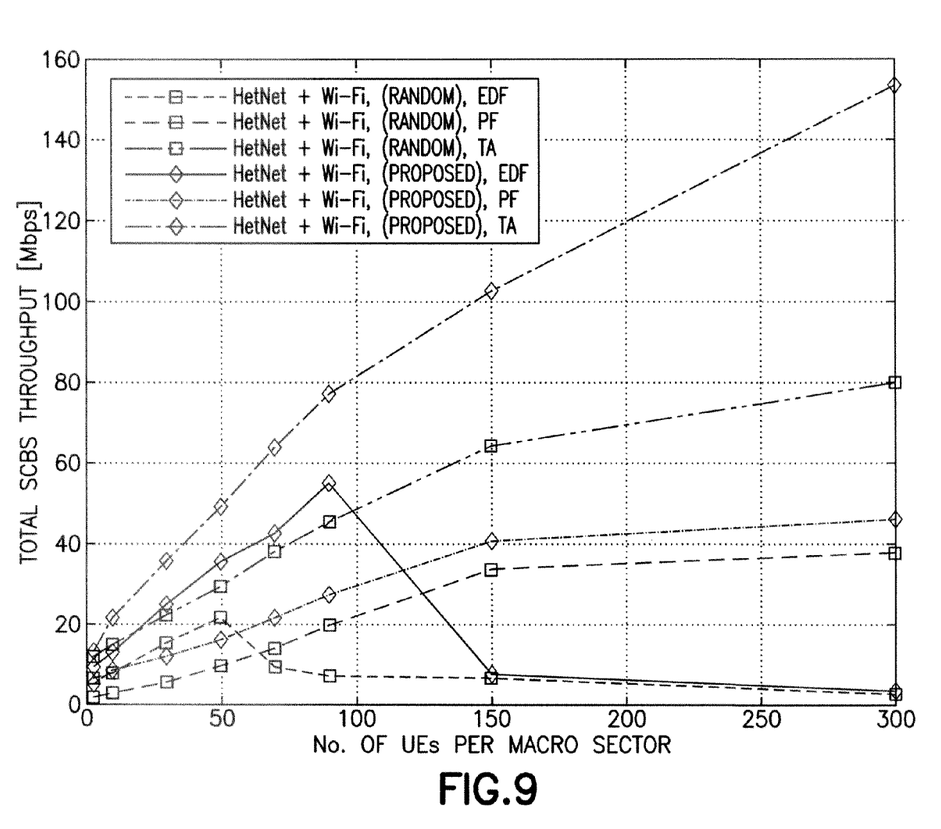
FIG. 9 is a graphical representation illustrating a total cell throughput as a function of the number of UEs in a network.
Figure 10:
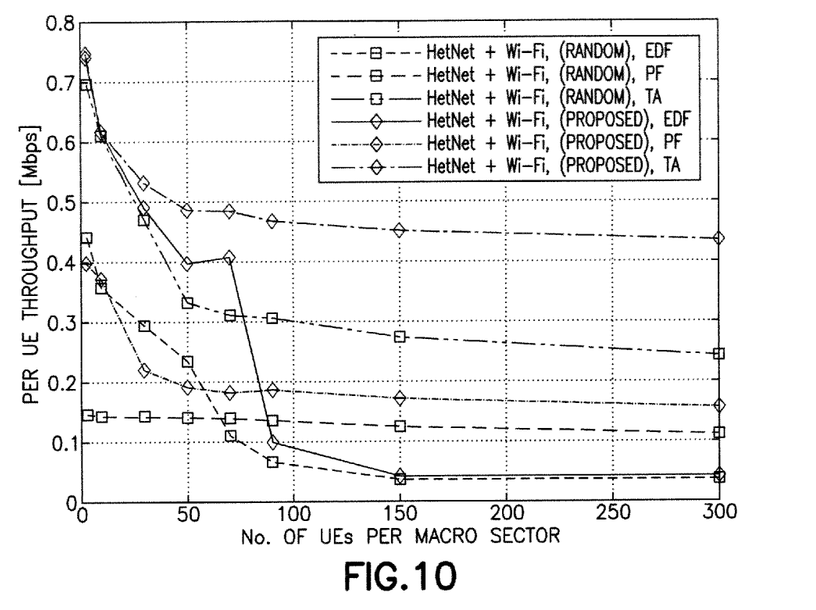
FIG. 10 is a graphical representation illustrating an average UE throughput as a function of the number of users per sector.

FIG. 8 plots the total cell throughput as a function of the deployed small cells. The proposed cross-system learning approach using the traffic-aware (TA) scheduler outperformed the traditional PF scheduler and earliest deadline first (EDF) scheduler, with gains reaching 200% when deploying 6 small cells. Additionally, FIG. 9 depicts the total cell throughput as a function of the number of UEs in the network. While the standard PF-based scheduler could not cope with the increasing number of UEs, the proposed approach was able to steer users' traffic in an intelligent and dynamic manner over both the licensed and unlicensed spectrums, and the gains were pronounced with 300 UEs. Finally, FIG. 10 plots the average UE throughput as a function of the number of users per sector, in which the proposed approach outperformed the benchmark algorithms with traditional schedulers, with 500% more gains as compared to the EDF with 300 UEs.

Figure 11:
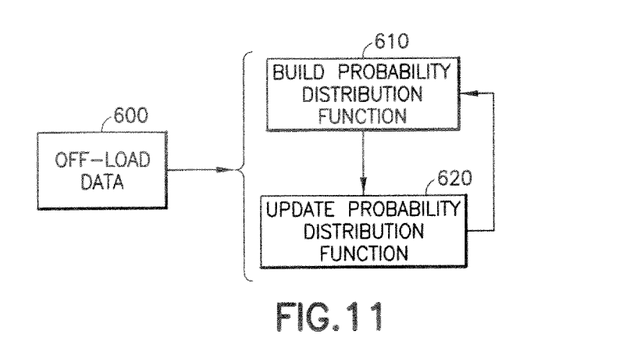
FIG. 11 is a flowchart representation of one exemplary embodiment of a method in which a telecommunications interaction system "learns" an environment.

Referring now to FIG. 11, a method of off-loading data traffic from user equipment in a coverage area of a small cell from a licensed band to an unlicensed band is designated generally by the reference number 600 and is hereinafter referred to as "off-loading 600." The off-loading 600 comprises a building step 610 for building a probability distribution function of a transmit configuration for power levels of sub-bands for licensed bands and unlicensed bands in the small cell. After the building step 610, an update step 620 updates the probability distribution function at an end of a selected time interval.

Although the present invention has been described herein before with reference to particular embodiments thereof, the present invention is not limited thereto and various modifications can be made thereto.

What is claimed is:

1. An apparatus, comprising:
one or more processors; and
one or more memories including computer program code;
the one or more memories and the computer program code configured, with the one or more processors, to cause the apparatus to perform at least the following:
off-loading of data traffic from user equipment in a coverage area of a cell from a first band to a second band, comprising,
building a probability distribution function of a transmit configuration for power levels of sub-bands for first bands and second bands in the cell, and
updating the probability distribution function being configured at an end of a selected time interval;
further comprising the apparatus being caused to perform carrying out a two-phase procedure comprising selecting a sub-band based on spectrum usage characteristics for the first and second bands in the cell relative to previous time periods and scheduling at least one user equipment according to a quality of service requirement of the at least one user equipment, wherein user equipment with particular quality of service requirements are not off-loaded to the second band;
wherein the apparatus being caused to select the sub-band comprises a balancing of new action/strategy exploration and accumulated history exploitation;
wherein the apparatus being caused to select the sub-band by balancing new action/strategy exploration and accumulated history exploitation comprises a behavioral assumption that cells are interested in choosing a probability distribution that minimizes a regret; and wherein the behavioral assumption is modeled by the probability distribution $\beta_k(r_k^+(t))$ satisfying:

$$\beta_k(r_k^+(t)) \in \arg\min_{p_k \in \Delta(A_k)} \left[ \sum_{p_k \in A_k} \pi_{k,p_k} r_{k,p_k}(t) + \frac{1}{\kappa_k} H(p_k) \right],$$

where k represents a small cell base station, $\beta_k(r_k^+(t))$ is a probability distribution function (probability of regret as a function of time), $p_k$ is transmit power, $A_k$ is a power allocation vector, $\pi_k$ is a probability, $r_k$ is a regret value, H is the Shannon entropy function, and $\kappa_k$ is a temperature parameter.

2. The apparatus of claim 1, wherein the apparatus being caused to schedule at least one user equipment comprises scheduling using a long-term traffic-aware scheduling mechanism.

3. The apparatus of claim 2, wherein scheduling of the user equipment in the second band is determined by one or more periods of time over which access to a sub-band is randomly attempted, one or more periods of time over which access to the second band is made, and one or more periods of time during which the second band is sensed.

4. The apparatus of claim 3, wherein during the one or more periods of time over which access to the second band is made, the selected sub-band is allocated based on one of a coverage policy and a load policy.

5. The apparatus of claim 4, wherein under the coverage policy the user equipment with a maximum reference signal is selected and under the load policy non-real-time sensitive traffic is steered towards the second band based on a balance of available network parameters.

6. The apparatus of claim 1, wherein the first band is a licensed band and the second band is an unlicensed band.

7. The apparatus of claim 1, wherein the cell has a small coverage area.

8. A method, comprising:
off-loading data traffic from user equipment in a coverage area of a cell from a first band to a second band, comprising,
building a probability distribution function of a transmit configuration for power levels of sub-bands for first bands and second bands in the cell, and
updating the probability distribution function being configured at an end of a selected time interval;
wherein off-loading further comprises carrying out a two-phase procedure comprising selecting a sub-band based on spectrum usage characteristics for the first and second bands in the cell relative to previous time periods and scheduling at least one user equipment according to a quality of service requirement of the at least one user equipment, wherein user equipment with particular quality of service requirements are not off-loaded to the second band;
wherein selecting the sub-band based on the spectrum usage characteristics comprises selecting the sub-band by balancing a new action/strategy exploration and an accumulated history exploitation;
wherein selecting the sub-band based on the spectrum usage characteristics is based on an algorithm that comprises making a behavioral assumption that cells of a small cell base station are interested in choosing a probability distribution that minimizes a regret; and
comprising modeling the probability distribution $\beta_k(r_k^+(t))$ to satisfy:

$$\beta_k(r_k^+(t)) \in \arg\min_{p_k \in \Delta(A_k)} \left[ \sum_{p_k \in A_k} \pi_{k,p_k} r_{k,p_k}(t) + \frac{1}{\kappa_k} H(p_k) \right],$$

where k represents a small cell base station, $\beta_k(r_k^+(t))$ is a probability distribution function (probability of regret as a function of time), $p_k$ is transmit power, $A_k$ is a power allocation vector, $\pi_k$ is a probability, $r_k$ is a regret value, H is the Shannon entropy function, and $\kappa_k$ is a temperature parameter.

9. The method of claim 8, wherein scheduling the at least one user equipment comprises scheduling based on long term awareness of traffic.

10. The method of claim 9, wherein scheduling based on long-term traffic-awareness of traffic comprises scheduling the at least one user equipment in the second band by one or more periods of time over which access to a sub-band is attempted, one or more periods of time over which access to the second band is made, and one or more periods of time during which the second band is sensed.

11. The method of claim 10, further comprising, during the one or more periods of time over which access to the second band is made, allocating the selected sub-band based on one of a coverage policy and a load policy.

12. The method of claim 11, further comprising, under the coverage policy, selecting the user equipment with a maximum reference signal and, under the load policy, steering the non-real-time sensitive traffic towards the second band based on a balance of available network parameters.

13. The method of claim 8, wherein the first band is a licensed band and the second band is an unlicensed band.

14. The method of claim 8, wherein the cell has a small coverage area.

15. A non-transitory computer readable storage medium, comprising one or more sequences of one or more instructions which, when executed by one or more processors of an apparatus, cause the apparatus to at least:

off-load data traffic from user equipment in a coverage area of a cell from a first band to a second band, comprising, build a probability distribution function of a transmit configuration for power levels of sub-bands for first bands and second bands in the cell, and update the probability distribution function being configured at an end of a selected time interval;

wherein causing the apparatus to off-load further comprises carrying out a two-phase procedure comprising selecting a sub-band based on spectrum usage characteristics for the first and second bands in the cell relative to previous time periods and scheduling at least one user equipment according to a quality of service requirement of the at least one user equipment, wherein user equipment with particular quality of service requirements are not off-loaded to the second band;

wherein selecting the sub-band based on the spectrum usage characteristics comprises selecting the sub-band by balancing a new action/strategy exploration and an accumulated history exploitation;

wherein selecting the sub-band based on the spectrum usage characteristics is based on an algorithm that comprises making a behavioral assumption that cells of a small cell base station are interested in choosing a probability distribution that minimizes a regret; and comprising modeling the probability distribution $\beta_k(r_k^+(t))$ to satisfy:

$$\beta_k(r_k^+(t)) \in \arg\min_{p_k \in \Delta(A_k)} \left[ \sum_{p_k \in A_k} \pi_{k,p_k} r_{k,p_k}(t) + \frac{1}{\kappa_k} H(p_k) \right],$$

where k represents a small cell base station, $\beta_k(r_k^+(t))$ is a probability distribution function (probability of regret as a function of time), $p_k$ is transmit power, $A_k$ is a power allocation vector, $\pi_k$ is a probability, $r_k$ is a regret value, H is the Shannon entropy function, and $\kappa_k$ is a temperature parameter.

* * * * *